(12) United States Patent
Tanaka

(10) Patent No.: US 7,751,648 B2
(45) Date of Patent: Jul. 6, 2010

(54) IMAGE PROCESSING APPARATUS, IMAGE PROCESSING METHOD, AND COMPUTER PROGRAM

(75) Inventor: Tetsuomi Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 862 days.

(21) Appl. No.: 11/613,659

(22) Filed: Dec. 20, 2006

(65) Prior Publication Data

US 2007/0154112 A1 Jul. 5, 2007

(30) Foreign Application Priority Data

Jan. 5, 2006 (JP) .............................. 2006-000670

(51) Int. Cl.
*G06K 9/36* (2006.01)
*G06G 5/00* (2006.01)

(52) U.S. Cl. ...................................... 382/284; 345/629

(58) Field of Classification Search ................ 382/173, 382/176, 192, 199, 266, 282, 284; 345/629, 345/630, 634; 348/584, 588
See application file for complete search history.

(56) References Cited

U.S. PATENT DOCUMENTS 5,956,421 A 9/1999 Tanaka
7,133,559 B2 * 11/2006 Yamazaki .................... 382/199
7,437,002 B2 * 10/2008 Tanaka ........................ 382/199
2005/0047660 A1 3/2005 Tanaka

FOREIGN PATENT DOCUMENTS

JP 08-223409 A 8/1996

* cited by examiner

*Primary Examiner*—Yon Couso
(74) *Attorney, Agent, or Firm*—Canon U.S.A., Inc. I.P. Division

(57) ABSTRACT

An image processing apparatus generates binary image data by performing binarization processing on input image data and generates edge image data by performing edge extraction processing to the input image data. The image processing apparatus acquires a first area identification result by performing area identification processing on the generated binary image data and acquires a second area identification result by performing area identification processing on the generated edge image data. In addition, the image processing apparatus generates a merged area identification result by merging the first area identification result and the second area identification result and generates an output binary image by performing partial binarization processing on the input image data according to each character area included in the generated merged area identification result.

11 Claims, 12 Drawing Sheets

| DESIGNATED TIME ZONE | |
|---|---|
| | DELIVERY TIME ZONE |
| A | 8 AM TO 2 PM |
| B | 2 PM TO 6 PM |
| C | 6 PM TO 9 PM |
| WHEN DESIGNATED DAY FALLS ON SUNDAY OR HOLIDAY. | |

702

| DESIGNATED TIME ZONE | |
|---|---|
| | DELIVERY TIME ZONE |
| A | 8 AM TO 2 PM |
| B | 2 PM TO 6 PM |
| C | 6 PM TO 9 PM |
| WHEN DESIGNATED DAY FALLS ON SUNDAY OR HOLIDAY. | |

703

| DESIGNATED TIME ZONE | |
|---|---|
| | DELIVERY TIME ZONE |
| A | 8 AM TO 2 PM |
| B | 2 PM TO 6 PM |
| C | 6 PM TO 9 PM |
| WHEN DESIGNATED DAY FALLS ON SUNDAY OR HOLIDAY. | |

704

DESIGNATED TIME ZONE

DELIVERY TIME ZONE

A              8 AM TO 2 PM

B              2 PM TO 6 PM

C              6 PM TO 9 PM

WHEN DESIGNATED DAY FALLS ON SUNDAY OR HOLIDAY.

IMAGE PROCESSING APPARATUS, IMAGE PROCESSING METHOD, AND COMPUTER PROGRAM

BACKGROUND OF THE INVENTION

1. Field of the Invention

The present invention relates to a binarization method for binarizing an input original image.

2. Description of the Related Art

In recent years, color document images are increasingly used due to an improvement in capacity of computers, an increase in memory capacity, and a development of color scanner devices.

Meanwhile, character portions of a captured document image can be character-recognized to be converted into text data. In addition, in performing scanning of a large amount of originals with an automatic document feeder (ADF), an orientation of characters in each original can be determined so as to automatically determine a correct orientation of the original. The original then can be printed out in a correct orientation. In this regard, what is significant in the above-described processing is the accuracy of character recognition.

In order to improve the accuracy of character recognition, it is significant to obtain a binarized image suitable for character recognition. For example, in a binarization method discussed in Japanese Patent Application Laid-Open No. 08-223409, a type of an input image is determined, and if a result of the determination indicates an image having a single density object, the input image is subjected to simple binarization processing, and on the other hand, if a result of the determination does not indicate an image having a single density object, the input image is subjected to pseudo halftone binarization processing. In addition, in a binarization method discussed in U.S. Pat. No. 5,956,421, in performing binarization processing in units of blocks having a given size, a luminance frequency is computed based on a multilevel image in each block, and a threshold value is computed based on an average value and a skew value of the luminance frequencies. Additionally, U.S. patent application Publication No. US 2005/0047660 A1 discusses a method for binarizing reversed characters (outline characters).

However, in the conventional methods as discussed in Japanese Patent Application Laid-Open No. 08-223409 and U.S. Pat. No. 5,956,421, separate processing needs to be performed in performing character recognition on reversed characters.

Furthermore, in the binarization method discussed in U.S. patent application Publication No. US 2005/0047660 A1, partial binarization processing is performed on an image portion (area) that is determined to be a character area based on an edge image, and partial binarization processing is further performed on an image portion (area) that is determined to be a character area based on a binary image generated by simple binarization processing of a whole image. Then, an output image is generated by merging two partially-binarized images generated by partial binarization processing. Therefore, this binarization method requires processing time for performing the above-described operations.

SUMMARY OF THE INVENTION

According to an aspect of the present invention, an image processing apparatus includes a binary image generation unit configured to generate binary image data by performing binarization processing on input image data; an edge image generation unit configured to generate edge image data by performing edge extraction processing on the input image data; a first area identification unit configured to acquire a first area identification result by performing area identification processing on the binary image data; a second area identification unit configured to acquire a second area identification result by performing area identification processing on the edge image data; a merging unit configured to generate a merged area identification result by merging the first area identification result and the second area identification result; and an output binary image generation unit configured to generate output binary image data by performing partial binarization processing on the input image data according to each character area included in the merged area identification result.

According to another aspect of the present invention, an image processing apparatus includes a binary image generation unit configured to generate binary image data by performing binarization processing on an input image; an edge image generation unit configured to generate edge image data by performing edge extraction processing on the binary image data; a first area identification unit configured to acquire a first area identification result by performing area identification processing on the binary image data; a second area identification unit configured to acquire a second area identification result by performing area identification processing on the edge image data; a merging unit configured to generate a merged area identification result by merging the first area identification result and the second area identification result; and an output binary image generation unit configured to generate output binary image data by performing partial binarization processing on the binary image data according to each character area included in the merged area identification result.

According to an exemplary embodiment of the present invention, after merging overlapping character areas based on a character area that is identified based on edge image data and a character area that is identified based on normal binary image data, partial binarization processing is performed. Accordingly, a part of the processing performed on an overlapping portion of the two area identification results can be omitted. In addition, information on the merged character area is generated as well as output binary image data, so that the information on the merged character area can be utilized for character recognition processing that is to be subsequently performed.

In addition, one merged area identification result is generated based on two different area identification results. Accordingly, any erroneous detection of one area identification result can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an example of an image that is more suitable to an extraction of a character area using a binary image.

DETAILED DESCRIPTION OF THE EMBODIMENTS

Various exemplary embodiments, features, and aspects of the invention will be described in detail below with reference to the drawings. It should be noted that the relative arrangement of the components, the numerical expressions and numerical values set forth in these embodiments do not limit the scope of the present invention unless it is specifically stated otherwise.

First Exemplary Embodiment

Figure 12:
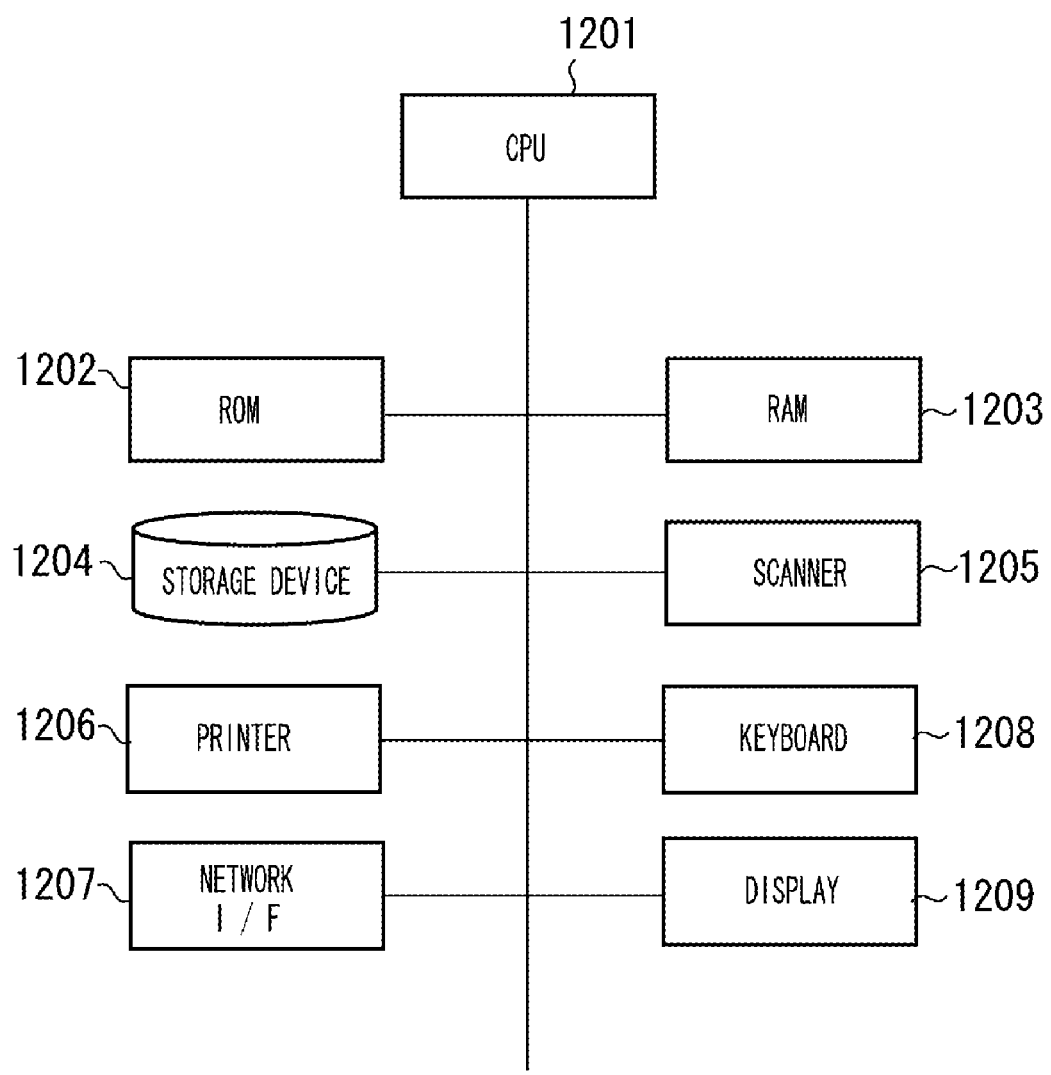
FIG. 12 illustrates an example of an image processing apparatus according to an exemplary embodiment of the present invention.

FIG. 12 illustrates an example of an image processing apparatus according to a first exemplary embodiment of the present invention. The image processing apparatus includes a central processing unit (CPU) 1201 and a read-only memory (ROM) 1202 that stores a program for the CPU 1201 and various data. A random access memory (RAM) 1203 functions as a work area for the CPU 1201, temporarily storing a document image to be processed. The CPU 1201 can execute a computer program that includes code for performing each processing to be described below. A storage device 1204 can store document images or files. A scanner 1205 can read a document image to be processed. A printer 1206 can print out a document image. A network interface (I/F) 1207 can distribute a generated compressed image. A keyboard 1208 and a display 1209 serve as user interfaces for an operation by a user and a display.

Figure 1:
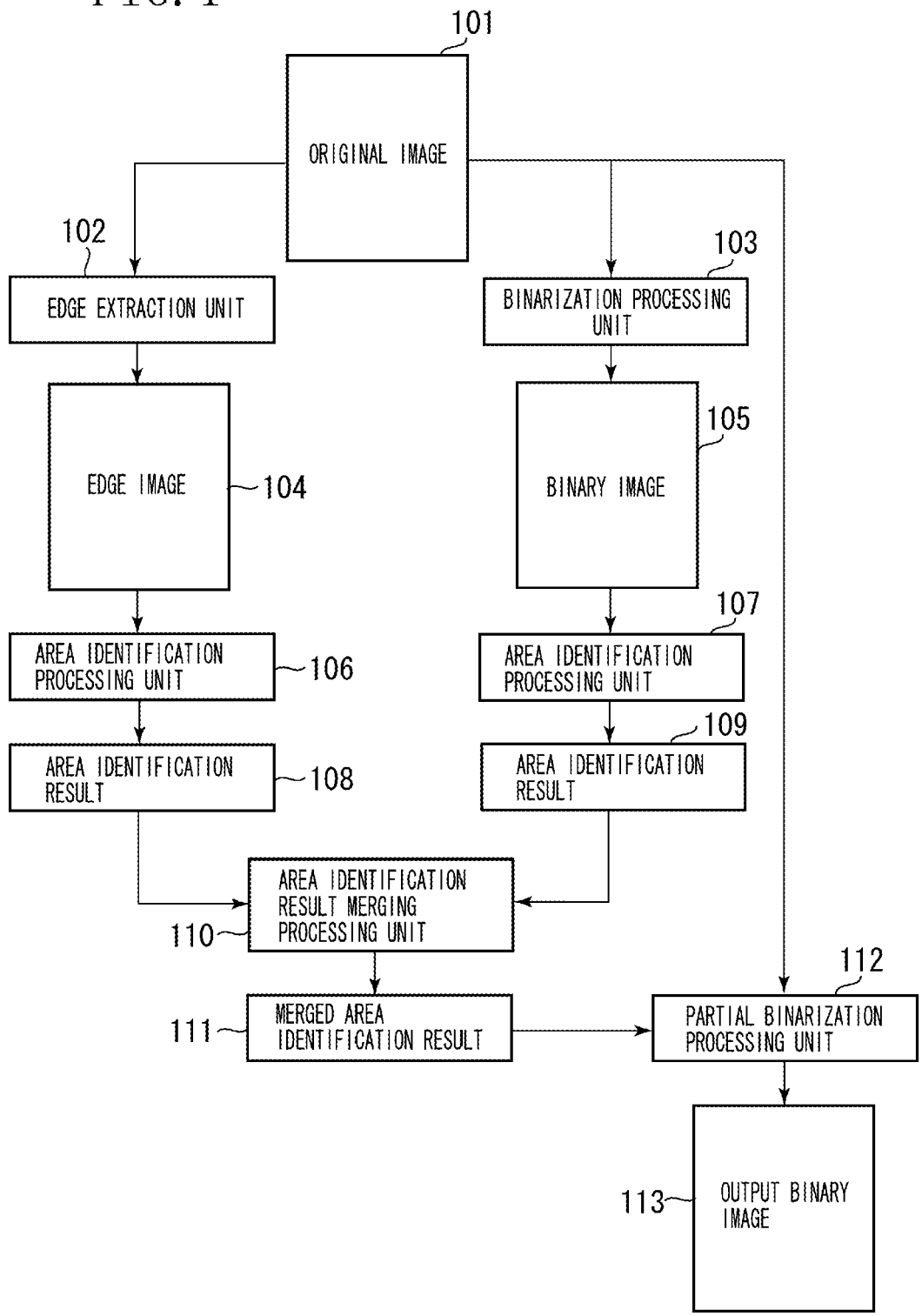
FIG. 1 illustrates an exemplary configuration of an image processing apparatus according to a first exemplary embodiment of the present invention.

FIG. 1 illustrates an exemplary configuration of an image processing apparatus according to the first exemplary embodiment. Original image data 101 is a document image that includes characters and the like. An edge extraction unit 102 performs processing for producing an edge image 104 from the original image 101 using a suitable method such as Sobel filtering. For example, the edge extraction unit 102 generates a differential image by performing the Sobel filtering on luminance values of an original image and generates an edge image by binarizing the differential image with a given threshold value. The edge image includes an edge portion having a large luminance difference provided with a value "1" (black) and a portion having a small luminance difference provided with a value "0" (white).

A binarization processing unit 103 generates a binary image 105 by binarizing the original image 101 with a simple binarization method using a fixed threshold value.

Area identification processing units 106 and 107 extract a character area from the edge image 104 and the binary image 105, respectively. The character area is extracted by detecting a black pixel block in each image and determining the size and density of the detected black pixel block and determining whether another black pixel block exists in the vicinity of the detected black pixel block. Information on the character area extracted by the area identification processing units 106 and 107 is output as area identification results 108 and 109, respectively.

An area identification result merging processing unit 110 compares two area identification results 108 and 109 to merge the area identification results 108 and 109 into a merged area identification result 111, and outputs the merged area identification result 111 to a partial binarization processing unit 112. The partial binarization processing unit 112 generates an output binary image 113 by performing partial binarization processing on each character area based on the original image 101 and the merged area identification result 111.

Figure 2:
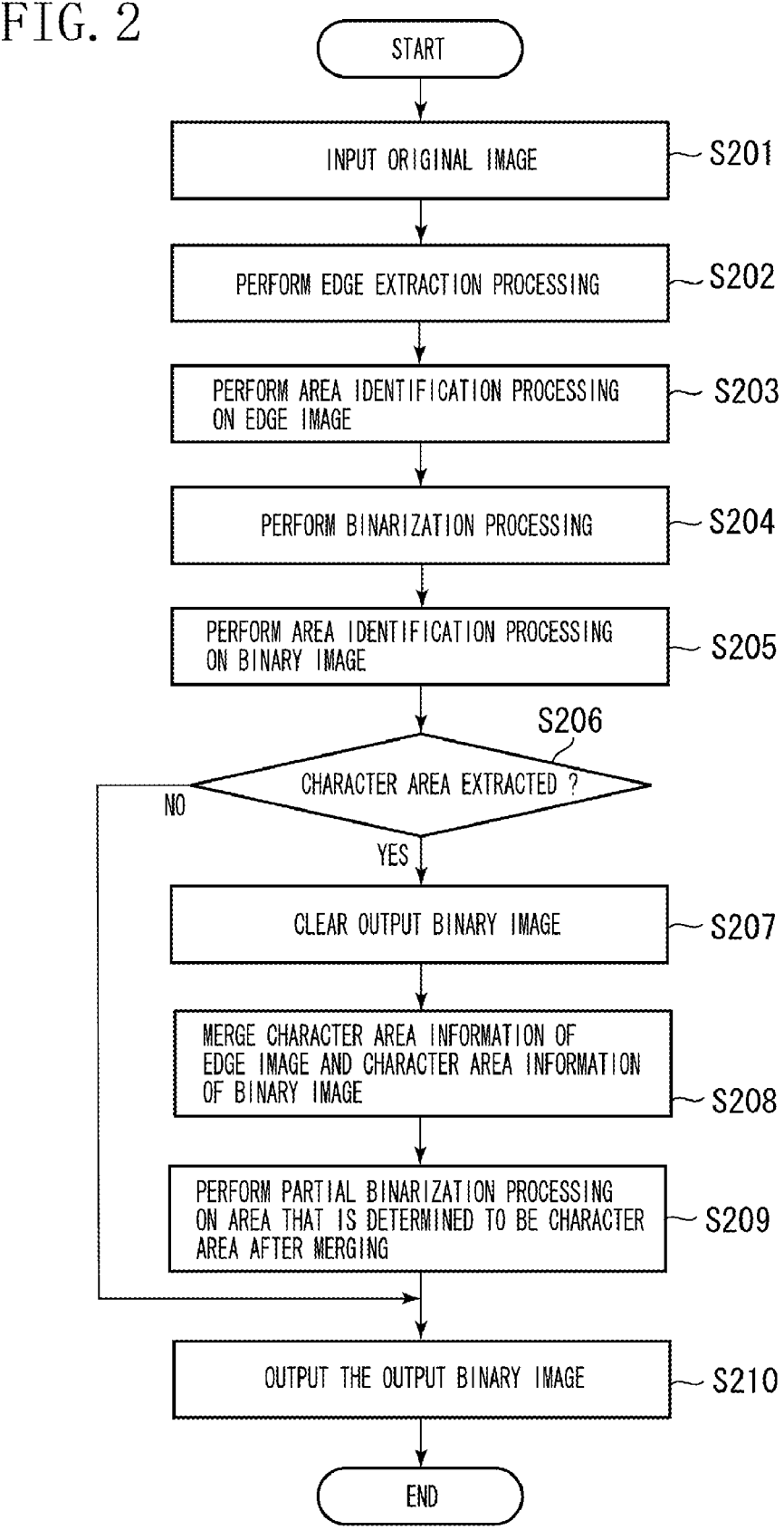
FIG. 2 is a flow chart that illustrates processing according to the first exemplary embodiment of the present invention.

FIG. 2 is a flow chart that illustrates processing according to the first exemplary embodiment.

Figure 5:
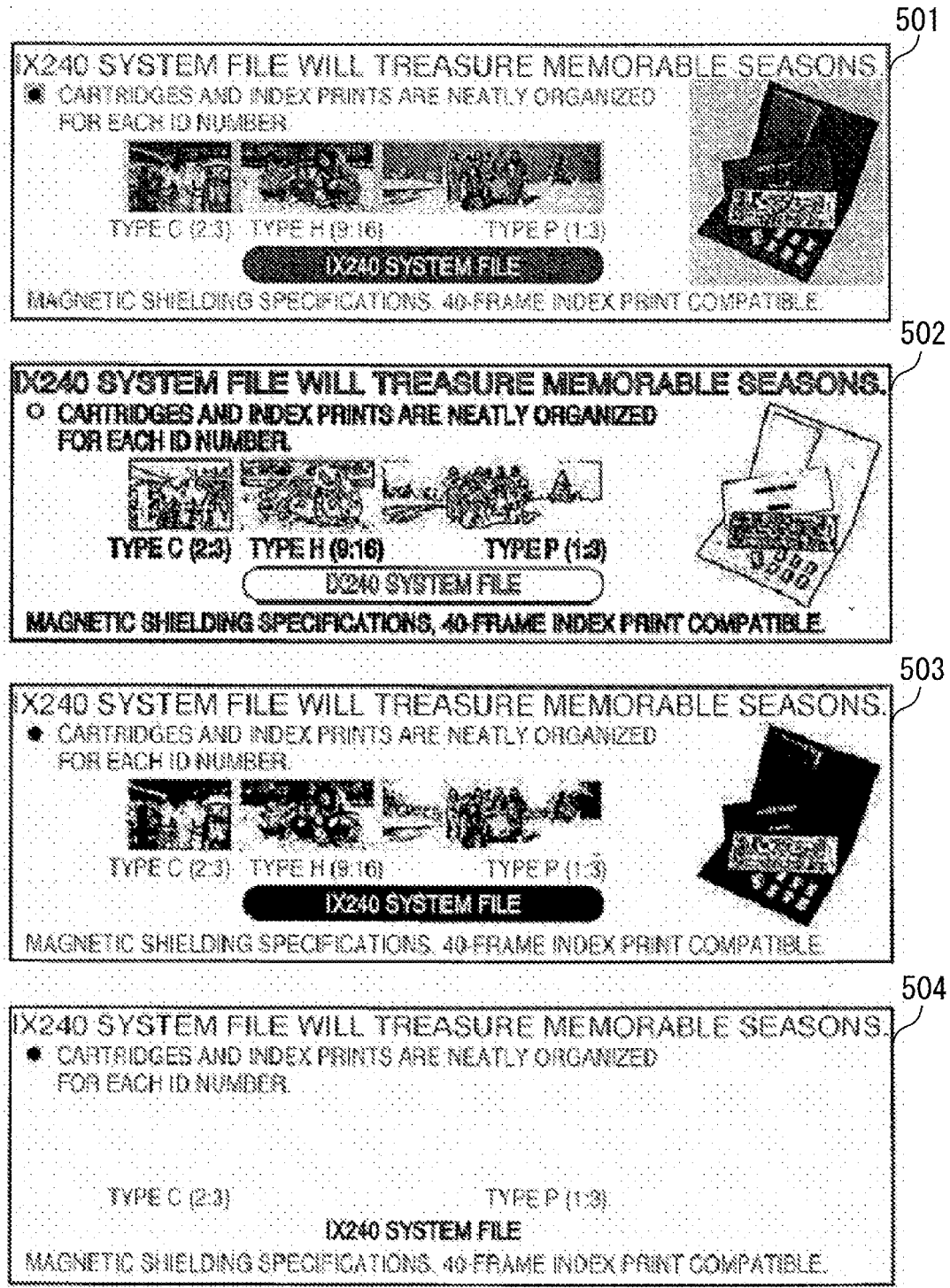
FIG. 5 illustrates examples of an original image, an edge image, a binary image, and an output binary image.

In step S201, the CPU 1201 reads an image of a document as the original image 101. An image 501 shown in FIG. 5 represents an example of the original image 101.

In step S202, the edge extraction unit 102 extracts an edge of an image from the original image 101 input in step S201 to generate the edge image 104. An image 502 shown in FIG. 5 represents an example of the edge image 104. An edge image is formed, for example, by applying a value "1" (black pixel) to a pixel whose luminance difference from an adjacent pixel is larger than a predetermined threshold value and a value "2" (white pixel) to a pixel whose luminance difference from an adjacent pixel is equal to or smaller than the predetermined threshold value. The luminance difference between each pixel and an adjacent pixel can be obtained by producing a differential image using differential filtering processing such as Sobel filtering.

In step S203, the area identification processing unit 106 extracts a character area 108 from the edge image 104. For example, the area identification processing unit 106 detects a block of black pixels in the edge image 104 and determines whether the block is a character based on the size and density of the detected black pixel block. In addition, if a black pixel block of a character of the same size as the size of the detected black pixel block exists in its vicinity, the area identification processing unit 106 determines that the black pixel block is a character in the same character string. Then, the area identification processing unit 106 extracts a character area 108 that surrounds the character string.

In step S204, the binarization processing unit 103 generates the binary image 105 from the original image 101. A binarization method used here can be a binarization method suitable for a character area as discussed in Japanese Patent Application Laid-Open No. 08-223409 or U.S. Pat. No. 5,956,421. An image 503 shown in FIG. 5 represents an example of the binary image 105.

In step S205, the area identification processing unit 107 extracts a character area 109 from the binary image 105. For example, the area identification processing unit 107 detects a block of black pixels in the binary image 105 and determines whether the block is a character based on the size and density of the detected black pixel block. In addition, if a black pixel block of a character of the same size as the size of the detected black pixel block exists in its vicinity, the area identification processing unit 107 determines that the black pixel block is a character in the same character string. Then, the area identification processing unit 107 extracts a character area 109 that surrounds the character string.

The same configuration can be used for the area identification processing units 106 and 107, although images to be processed by each of the area identification processing units 106 and 107 are mutually different. Here, a comparatively small character in the edge image 104 has a character format that is substantially the same as a character format of a boldface character, and a comparatively large character in the edge image 104 has a character format that is substantially the same as a character format of an outline character. Accordingly, the character area can be extracted with the same area identification method such as a method for detecting adjacent groups of black pixels.

In step S206, the CPU 1201 determines whether a character area has been extracted. If it is determined that no character area has been extracted in both step S203 and step S205, the processing advances to step S210. In step S210, the partial binarization processing unit 112 outputs the binary image 105, which is generated in step S204, as an output binary image 113.

On the other hand, if in step S206 it is determined that a character area has been extracted, the processing advances to step S207. In step S207, the partial binarization processing unit 112 initializes the output binary image 113. The whole part of the output binary image 113 is initialized with white pixels, because although edge extraction processing and binarization processing are performed on a whole area of the original image 101 in steps S202 and S204, only the character area portions are output in the processing in steps S208 and S209.

In step S208, the area identification result merging processing unit 110 merges two area identification results, namely, the area identification result 108 and the area identification result 109, which have been extracted in step S203 and step S205, respectively, to generate the merged area identification result 111.

In step S209, the partial binarization processing unit 112 performs partial binarization processing on the original image 101 with respect to each character area of the merged area identification result 111 generated in step S208 to overwrite each associated portion of the output binary image 113. The partial binarization processing includes processing for binarizing an image by computing an optimum binarization threshold value for each area portion.

An output binarization image 504 shown in FIG. 5 is an example of the output binary image 113, which is a result of processing of a multilevel image 501 according to the above-described method. Because only a character area is binarized and output as the output binary image 113, both a reversed character portion and a nonreversed character portion can be output in a natural format.

In step S210, the output binary image 113 and the merged area identification result 111 are output as a final result. Because the output binary image 113 and the merged area identification result 111 are output as a final result, the output result can be utilized for character recognition processing to be performed in a later stage.

Figure 3:
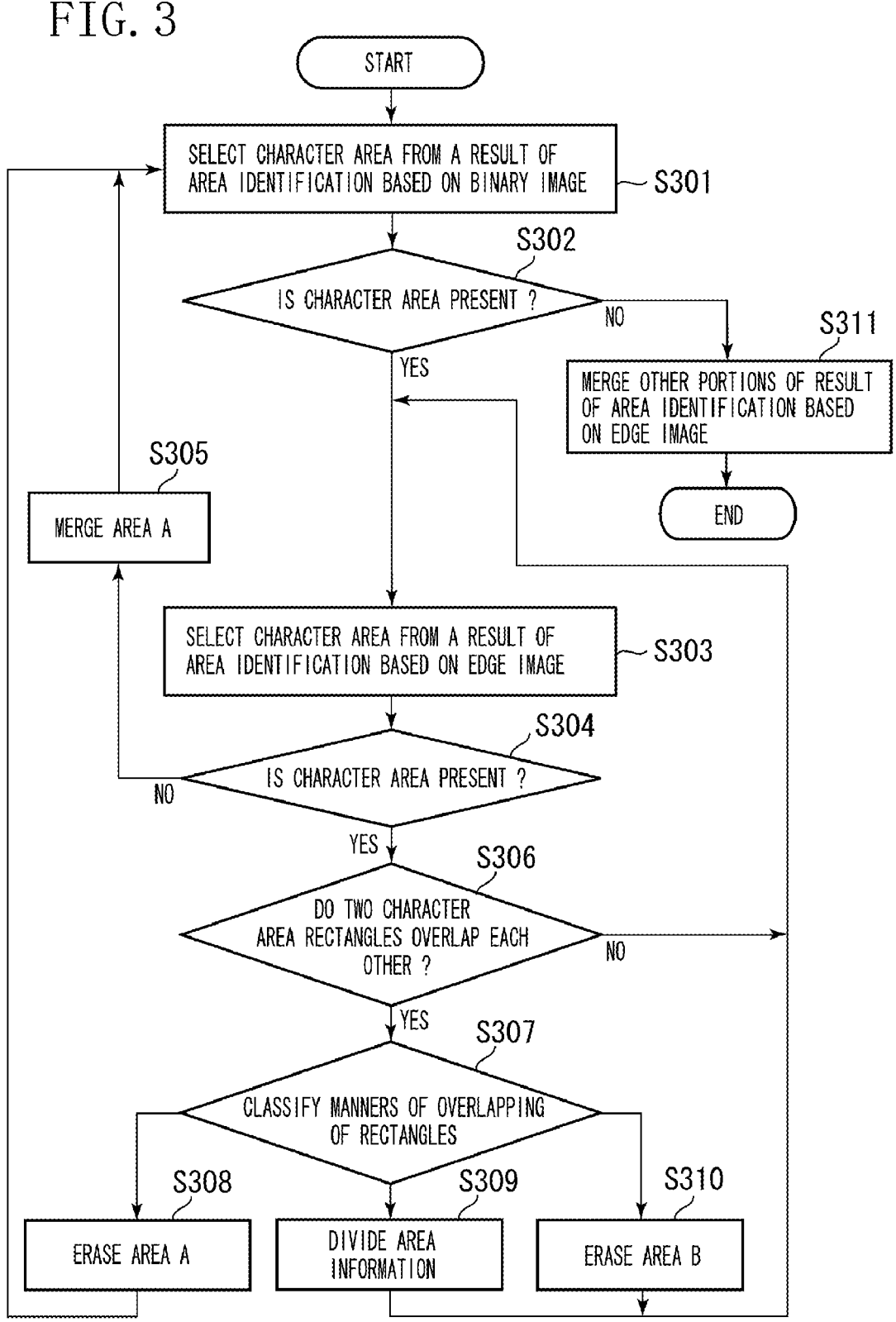
FIG. 3 is a flow chart that illustrates area identification result merging processing according to the first exemplary embodiment of the present invention.

FIG. 3 is a flow chart that illustrates a detailed procedure for the area identification result merging processing in step S208.

In step S301, the CPU 1201 performs processing for selecting one character area from the area identification result 109 obtained by area-identifying the binary image 105. Then, in step S302, the CPU 1201 determines whether a character area has been selected. If, as a result of the determination in step S302, it is determined that no character area to be selected remains, then the processing advances to step S311. On the other hand, if, as a result of the determination in step S302, it is determined that a character area to be selected remains, then the processing advances to step S303. When a character area is selected here, the selected character area is referred to as an "area A".

In step S303, the CPU 1201 performs processing for selecting one character area from the area identification result 108 obtained by area-identifying the edge image 104. Then, in step S304, the CPU 1201 determines whether a character area has been selected. If, as a result of the determination in step S304, it is determined that no character area to be selected remains, then the processing advances to step S305. On the other hand, if, as a result of the determination in step S304, it is determined that a character area to be selected remains, then the processing advances to step S306. When a character area is selected here, the selected character area is referred to as an "area B".

In step S305, the CPU 1201 adds character area information of the area A to the merged area identification result 111, and then the processing returns to step S301.

In step S306, the CPU 1201 determines whether a rectangle of the area A and a rectangle of the area B overlap each other. If it is determined in step S306 that the rectangle of the area A and the rectangle of the area B overlap each other, the processing advances to step S307. If it is determined in step S306 that the rectangle of the area A and the rectangle of the area B do not overlap each other, the processing returns to step S303. Here, even if the rectangle of the area A and the rectangle of the area B overlap each other, when an area of overlapping is smaller than a predetermined threshold value, the CPU 1201 operates based on a premise that the rectangle of the area A and the rectangle of the area B do not overlap each other.

In step S307, the CPU 1201 classifies manners of overlapping of the rectangle of the area A and the rectangle of the area B. A first pattern of the classification corresponds to a case where the area B contains the area A and an area ratio of the area B to the area A is equal to or larger than a predetermined threshold value (for example, the area ratio is equal to or larger than 2. (i.e. (size of area B/size of area A)$\geq$2)). Note that the threshold value can be experimentally determined and is not limited to the value computed by this expression. In the case of the first pattern, the processing advances to step S308. A second pattern of the classification corresponds to a case where a part of the area A and a part of the area B overlap each other and, when the area B is divided by an extension of each of straight lines that constitute four sides of the rectangular area A, the size of at least one of the divided areas of the area B, which does not overlap the area A is equal to or larger than a predetermined threshold value. In the case of the second pattern, the processing advances to step S309. In the case of patterns other than the first and second patterns, the processing advances to step S310.

In step S308, the CPU 1201 erases information of the area A that is selected from among the area identification result 109, and then the processing returns to step S301. The processing in step S308 is performed because in some cases, when a character is a reversed character having a large point size and the reversed character contains a black pixel portion (namely, for example, characters such as "A" and "B"), the area identification processing unit 107 may erroneously recognize the inner black pixel portion as a character area.

In step S309, the CPU 1201 selects an extension of a side of the rectangular area A such that, when the area B is divided by extensions of the straight lines that constitute four sides of the rectangular area A, the area of the divided area that does not overlap the area A, of the divided areas of the area B, becomes maximum. Then, the CPU 1201 substitutes area information of the area B in the area identification result 108 with area information of an area B' which is obtained by dividing the area B by the selected extension.

Figure 6:
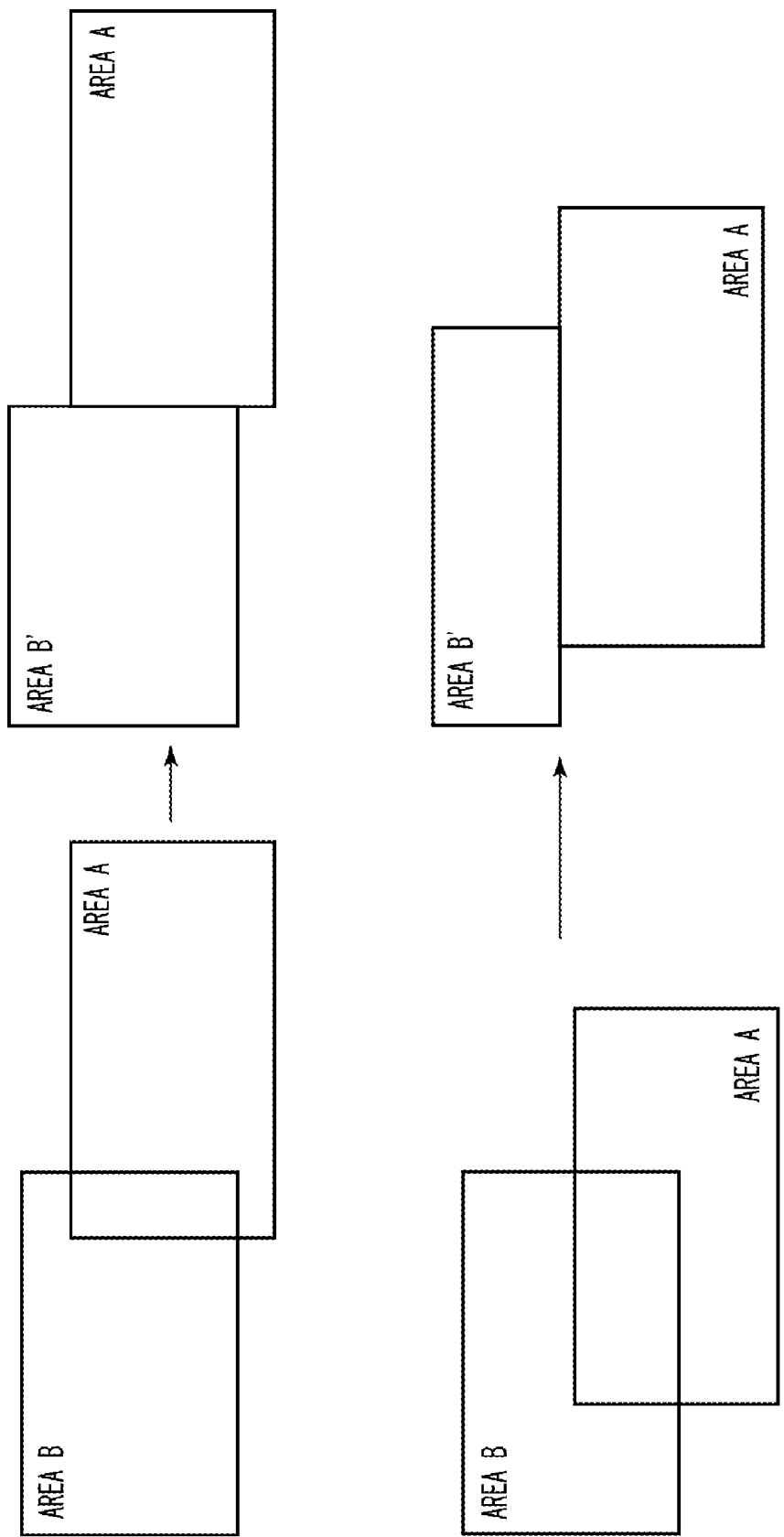
FIG. 6 illustrates examples of division of an area according to the first exemplary embodiment of the present invention.

In this regard, in the example illustrated in an upper portion of FIG. 6, for example, the area of the divided area B' is larger in the case where the area B is divided by a left vertical line of the area A than in the case where the area B is divided by an upper horizontal line of the area A. Accordingly, here, the left vertical line of the area A is selected. In addition, in the example illustrated in a lower portion of FIG. 6, the area of the divided area B' is larger in the case where the area B is divided by an upper horizontal line of the area A than in the case where the area B is divided by a left vertical line of the area A. Accordingly, here, the upper horizontal line of the area A is selected.

This processing is performed because in some cases, when a character having a high luminance and a character having a low luminance exist close to each other on a background surface having a medium luminance, the area identification processing unit 106 may erroneously determine the portion including the characters having different luminance levels as one character area. For example, in the case where a white character string exists on a red background surface and a black character string follows the white character string, an edge image is generated by extracting edges from either of the character strings, and accordingly, the area identification processing unit 106 may erroneously determine the character strings as one character string. That is, it is necessary to binarize the white character portion while reversing characters because the luminance of the white character portion is higher than the luminance of the red background surface and to binarize the black character portion without reversing characters. However, if the characters are binarized while determining whether to reverse characters in a range of the character area obtained by area identification based on the edge image 104, either the white character portion or the black character portion vanishes. In this regard, according to the present exemplary embodiment, the above-described processing is performed so as to mutually separate a reversed character portion and a nonreversed character portion since the area identification processing unit 107 can extract only a black character portion as a character area.

In step S310, the CPU 1201 determines that the same character area is extracted with respect to the area A and the area B, and the CPU 1201 erases information of the area B from the area identification result 108.

After the processing in step S309 or step S310, the processing returns to step S303. In step S303, the CPU 1201 selects a new area B.

On the other hand, if it is determined in step S302 that no unselected area A remains, then in step S311, the CPU 1201 adds information of the character area B that remains without being erased from the area identification result 108 to the merged area identification result 111.

Figure 4:
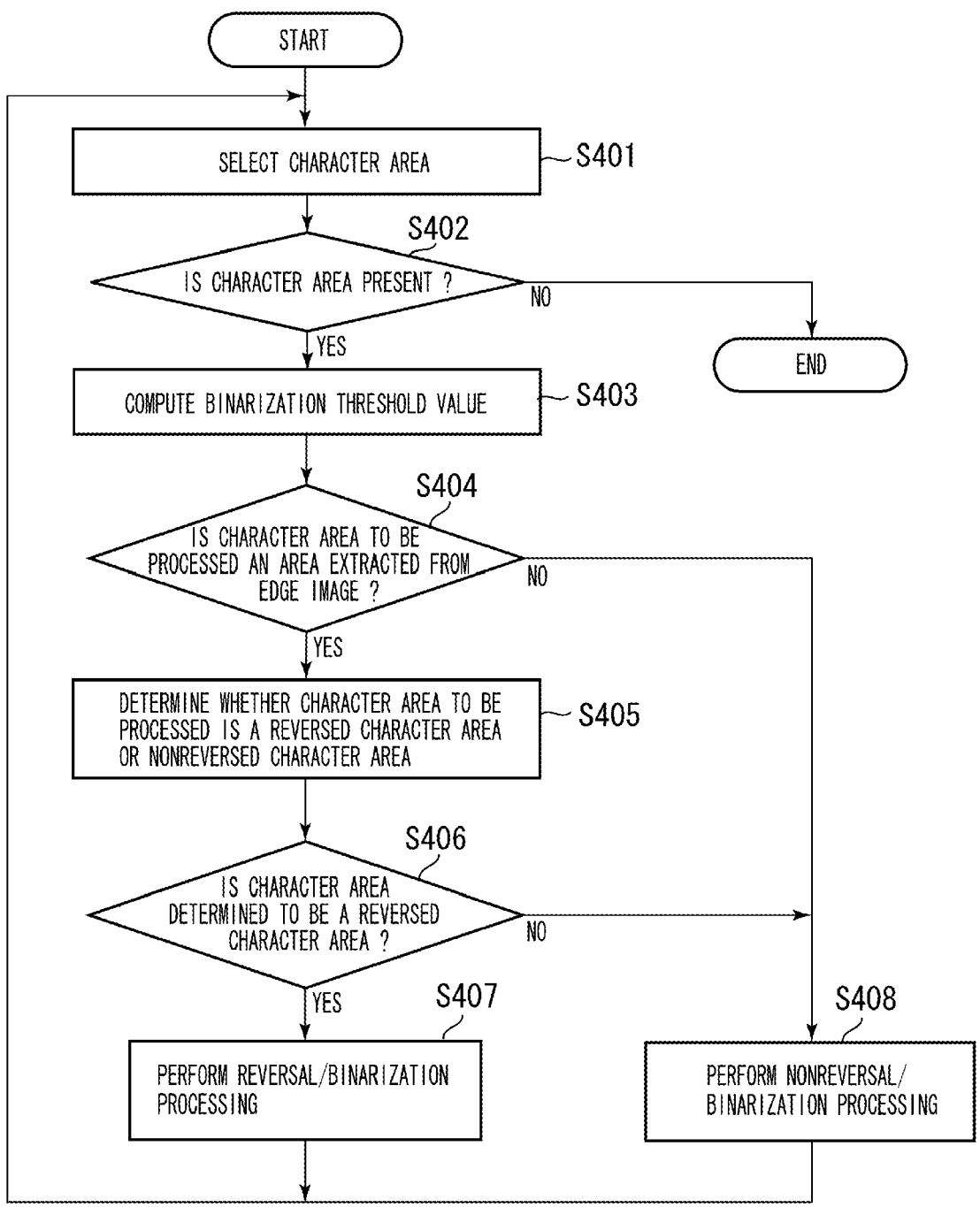
FIG. 4 is a flow chart that illustrates partial binarization processing according to the first exemplary embodiment of the present invention.

FIG. 4 is a flow chart that illustrates processing in step S209 that is performed by the partial binarization processing unit 112.

In step S401, the partial binarization processing unit 112 performs processing for selecting one character area from the merged area identification result 111.

In step S402, if it is determined that an unselected character area remains, the processing advances to step S403. On the other hand, if it is determined that no unselected character area remains, the processing ends.

In step S403, the partial binarization processing unit 112 computes a binarization threshold value based on an area portion of an original image that corresponds to the selected character area. The method of computing a binarization threshold value includes a suitable binarization threshold value computation method which can provide a high character image quality.

In step S404, the partial binarization processing unit 112 determines whether the character area to be processed is either data obtained by merging the area identification result 108 based on the edge image 104 or data obtained by merging the area identification result 109 based on the binary image 105. Here, the character area information that is added in step S305 is the data obtained by merging the area identification result 109, and the character area information added in step S311 is the data obtained by merging the area identification result 108. If it is determined in step S404 that the character area to be processed is the data obtained by merging the area identification result 108 (namely, a character area extracted from the edge image 104), the processing advances to step S405. On the other hand, if it is determined in step S404 that the character area to be processed is not the data obtained by merging the area identification result 108, the processing advances to step S408.

In step S405, the partial binarization processing unit 112 performs reversed/nonreversed character area determination processing. In the reversed/nonreversed character area determination processing, the partial binarization processing unit 112 determines whether the character area to be processed is a non-reversed character area, which includes dark characters on a bright background surface, or a reversed character area, which includes bright characters on a dark background surface. The reversed/nonreversed character area determination processing includes the following methods 1 through 4.

<The reversed/nonreversed character area determination processing 1> In the reversed/nonreversed character area determination processing 1, the partial binarization processing unit 112 computes a white-to-black ratio in the image binarized with the threshold value computed in step S403. When a white portion is larger than a black portion, the partial binarization processing unit 112 determines that the character area is a nonreversed character area. On the other hand, when a black portion is larger than a white portion, the partial binarization processing unit 112 determines that the character area is a reversed character area. In the case where the threshold value is set for the luminance, when the threshold value is smaller than an average luminance of the character area to be processed, the partial binarization processing unit 112 determines that the character area is a nonreversed character area, and on the other hand, when the threshold value is higher than an average luminance of the character area to be processed, the partial binarization processing unit 112 determines that the character area is a reversed character area.

<The reversed/nonreversed character area determination processing 2> In the reversed/nonreversed character area determination processing 2, the partial binarization processing unit 112 computes a white-to-black ratio in the image binarized with the threshold value computed in step S403 with respect to a boundary portion of a rectangular character area to be processed. When a white portion is larger than a black portion, the partial binarization processing unit 112 determines that the character area is a nonreversed character area. On the other hand, when a black portion is larger than a white portion, the partial binarization processing unit 112 determines that the character area is a reversed character area.

<The reversed/nonreversed character area determination processing 3> When a method discussed in Japanese Patent Application Laid-Open No. 08-223409 or U.S. Pat. No. 5,956,421 is used for the binarization threshold value computation processing in step S403, the partial binarization processing unit 112 determines whether the character area is a reversed character area or a nonreversed character area based on a sign of skew in a histogram. If a skew value is a negative value, the partial binarization processing unit 112 determines that the character area is a nonreversed character area. On the other hand, if a skew value is a positive value, the partial binarization processing unit 112 determines that the character area is a reversed character area. In this method, the skew value is completely computed before determining a binarization threshold value, and accordingly, the processing can be performed at a higher speed.

<The reversed/nonreversed character area determination processing 4> In the reversed/nonreversed character area determination processing 4, a combination of the above-described methods 1 through 3 can be used. When a difference between black and white portions is smaller than a predetermined value in the reversed/nonreversed character area determination processing 1 and an absolute value of the skew value is smaller than a predetermined value in the reversed/nonreversed character area determination processing 3, the partial binarization processing unit 112 further determines whether the character area is a reversed character area or a nonreversed character area using the reversed/nonreversed character area determination processing 2.

In step S406, if it is determined that the character area is a reversed character area according to the result of determination in step S405, the processing advances to step S407. On the other hand, if it is determined that the character area is a nonreversed character area according to the result of determination in step S405, the processing advances to step S408. In step S407, the partial binarization processing unit 112 performs binarization processing and white/black reversal processing (reversal and binarization processing) based on the binarization threshold value that is determined in step S403, and then outputs the processed character area as the output binary image 113.

On the other hand, in step S408, the partial binarization processing unit 112 performs normal binarization processing (nonreversal binarization processing) based on the binarization threshold value that is determined in step S403, and then outputs the processed character area as the output binary image 113.

When the processing in step S407 or step S408 is completed, the processing returns to step S401 to advance to the processing for selecting the next character area. Thus, the partial binarization processing unit 112 performs either the reversal and binarization processing or the nonreversal binarization processing on all of the character areas.

Figure 8:
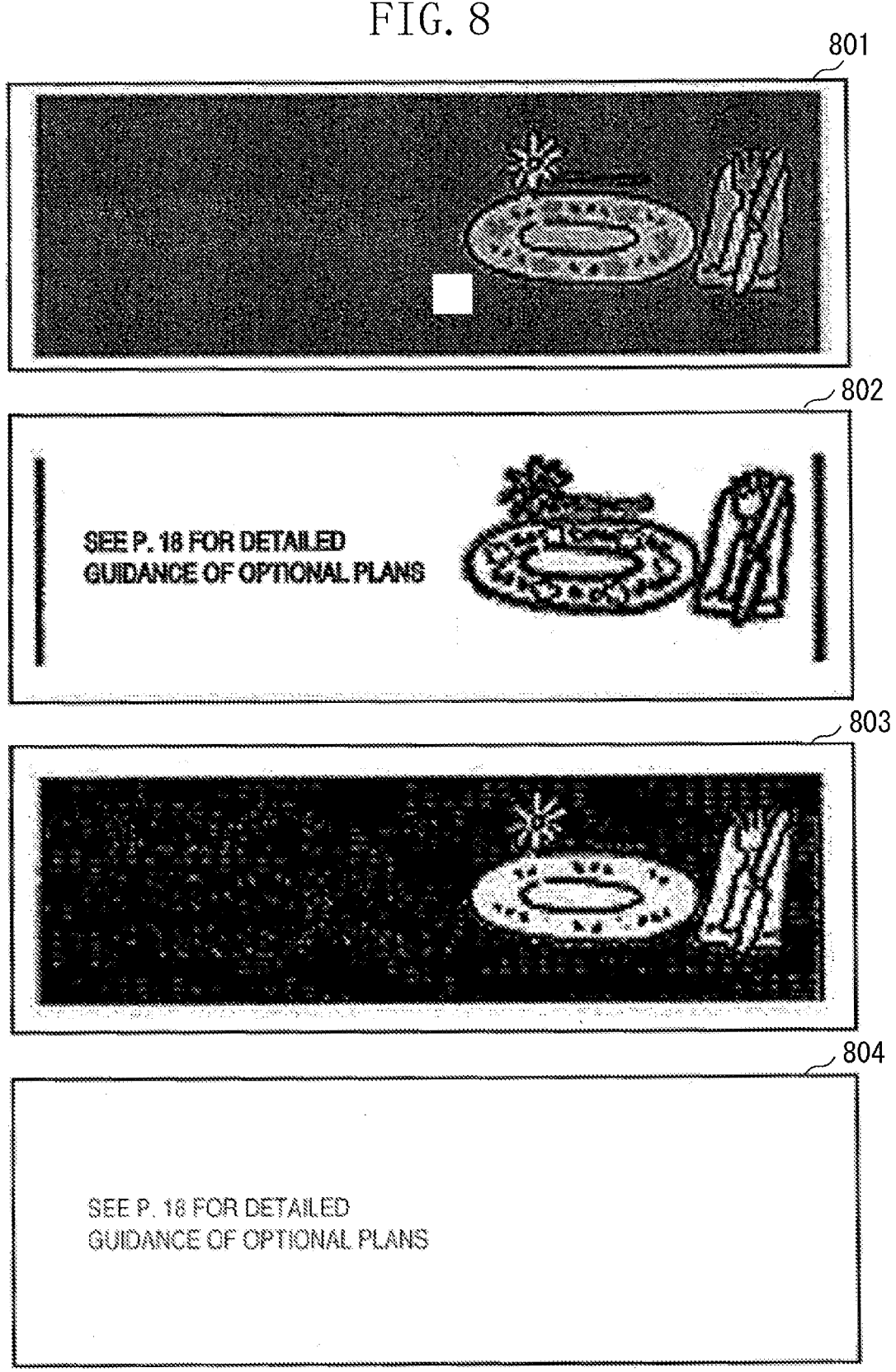
FIG. 8 illustrates an example of an image that is more suitable to an extraction of a character area using an edge image.

Advantageous effects of using both the edge image 104 and the binary image 105 are now described below. The edge image 104 obtained by edge extraction processing has advantages such that an edge image is not so much affected by a degree of brightness of a background surface and that both a reversed character area and a nonreversed character area can be extracted from an edge image. For example, FIG. 8 illustrates an original image 801, an edge image 802 of the original image 801, and a normal binary image 803. In the case where black characters exist on a dark background surface (for example, a dark green background surface) as in the original image 801, both the background surface and the characters are rendered in black by the normal binarization processing, as shown in the binary image 803. Accordingly, a character area cannot be extracted from the area identification result 109, which is a result of area identification of a binary image obtained by the normal binarization processing. On the other hand, because an edge image is detected according to displacement of luminance, a character area can be extracted from an edge image as shown in the edge image 802, even in the case where the background surface is dark as in the original image 801. By extracting a character area from an edge image, an image 804 can be obtained as the output binary image 113.

However, because an edge exists in a contour portion of a character, the size of a character or a line becomes large in an edge image. Accordingly, in the case of a table 701 shown in FIG. 7, in an edge image 702 generated by the edge extraction unit 102, a character portion and a ruled line portion become thickened, and accordingly, the character portion and the ruled line portion become apt to contact each other. Because it is difficult to separate a character that contacts another portion such as a ruled line, an accuracy of character extraction from a table area degrades. In addition, because the edge extraction processing is filtering processing, a noise may occur in response to a local displacement of the luminance, which obstructs the character extraction.

Meanwhile, when a high luminance character and a low luminance character exist close to each other on a background surface having a medium luminance level, a binary image 703 generated by the binarization processing unit 103 can be utilized for discriminating the high luminance character and the low luminance character. In addition, because characters are binarized in an as-is size, the separation of a character from a ruled line can be easily performed even in the case of a table. Accordingly, in step S310, the character area extracted from the binary image 105 remains unerased on a priority basis. By merging the area identification result 108 that is identified using the edge image 702 and the area identification result 109 that is identified using the binary image 703, the merged area identification result 111 can be generated. In addition, by performing partial binarization processing using the merged area identification result 111, a binary image 704 of characters can be correctly output.

An example of another configuration of the image processing apparatus according to the first exemplary embodiment is described below.

Referring to FIG. 1, the edge image 104 is not required after the area identification result 108 is obtained, and the binary image 105 is not required after the area identification result 109 is obtained. According to the flow of processing shown in FIG. 2, a memory can be shared for storing the edge image 104, the binary image 105, and the output binary image 113. Thus, the number of memories required for the image processing apparatus can be reduced.

In addition, referring to FIG. 1, the processing by the edge extraction unit 102, the area identification processing unit 106, and the area identification result 108 using the edge image 104 and the processing by the binarization processing unit 103, the area identification processing unit 107, and the area identification result 109 using the binary image 105 are performed independently from each other. Accordingly, the processing can be performed at a higher speed by performing the processing in a paralleled manner by allocating a separate circuit and a separate memory for each processing.

Furthermore, the partial binarization processing unit 112 can perform the following processing. Here, a memory that stores the binary image 105 and a memory that stores the output binary image 113 are configured by mutually separate memories. In performing the nonreversal binarization processing in step S408 shown in FIG. 4, when a difference between the binarization threshold value obtained in step S403 and the binarization threshold value computed in step S204 is within a predetermined range, a concerned portion of the stored binary image 105 can be copied onto the output binary image 113. With such a configuration, a time required for the binary processing can be shortened. Also, when a difference between the binarization threshold value obtained in step S407 and the binarization threshold value computed in step S204 is within a predetermined range, a concerned portion of the stored binary image 105 can be copied onto the output binary image 113 after being subjected to white/black inversion. With such a configuration, a time required for the binary processing can be shortened.

Second Exemplary Embodiment

Now, a second exemplary embodiment of the present invention is described with reference to FIG. 9, FIG. 10, and FIG. 11.

Figure 9:
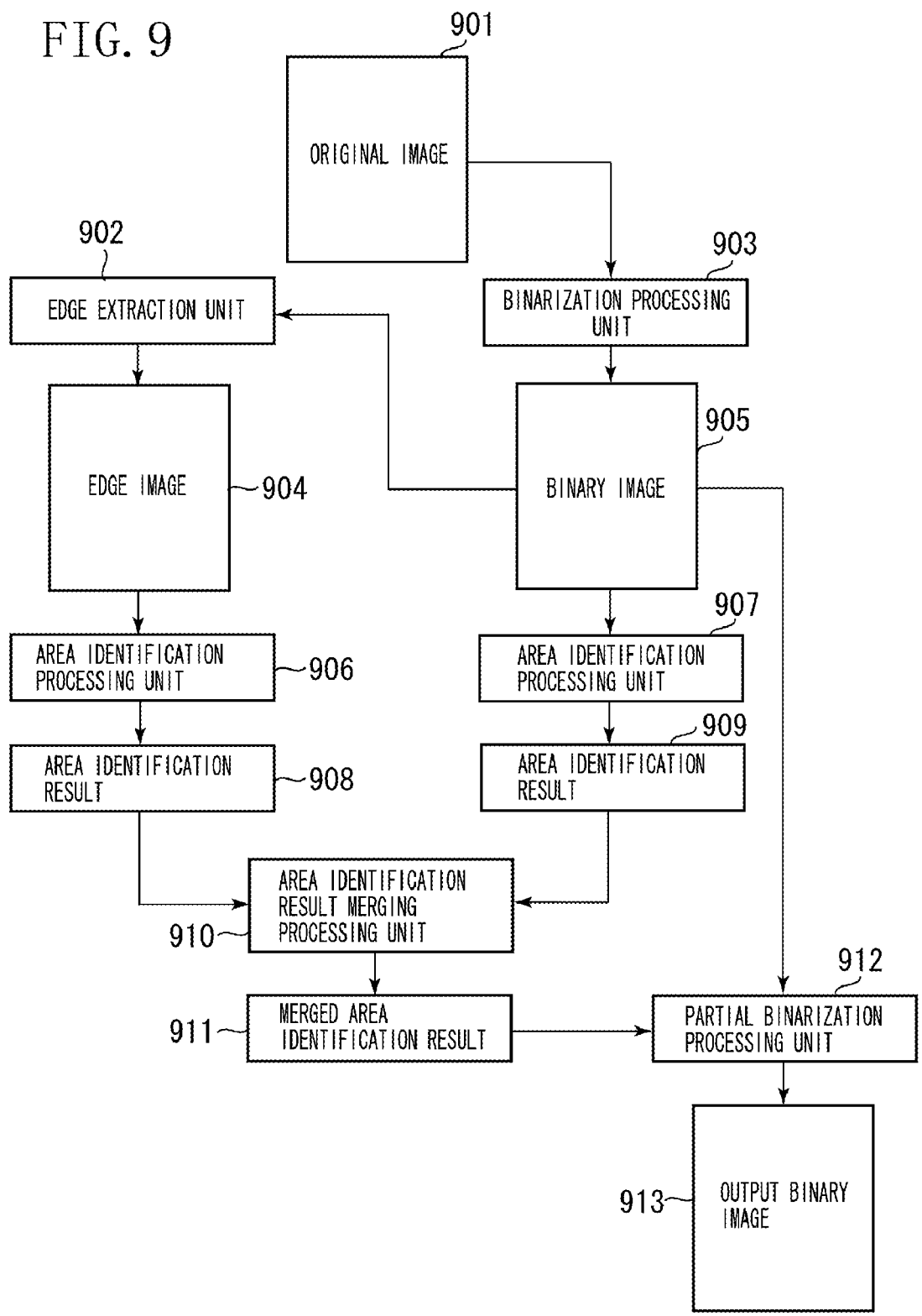
FIG. 9 illustrates an exemplary configuration of an image processing apparatus according to a second exemplary embodiment of the present invention.

FIG. 9 illustrates an exemplary configuration of an image processing apparatus according to the second exemplary embodiment of the present invention. Referring to FIG. 9, an original image 901 is a document image that contains characters. A binarization processing unit 903 generates a binary image 905 by binarizing the original image 901 with a simple binarization method using a fixed threshold value. An edge extraction unit 902 performs processing for producing an edge image 904 from a binary image 905. Area identification processing units 906 and 907 extract a character area from the edge image 904 and the binary image 905, respectively. Information of the character area extracted by the area identification processing units 906 and 907 is output as area identification results 908 and 909, respectively. An area identification result merging processing unit 910 compares two area identification results 908 and 909 to merge the area identification results 908 and 909 into a merged area identification result 911, and outputs the merged area identification result 911 to a partial binarization processing unit 912. The partial binarization processing unit 912 generates and outputs an output binary image 913, which includes only character areas, based on the binary image 905 and the merged area identification result 911.

Figure 10:
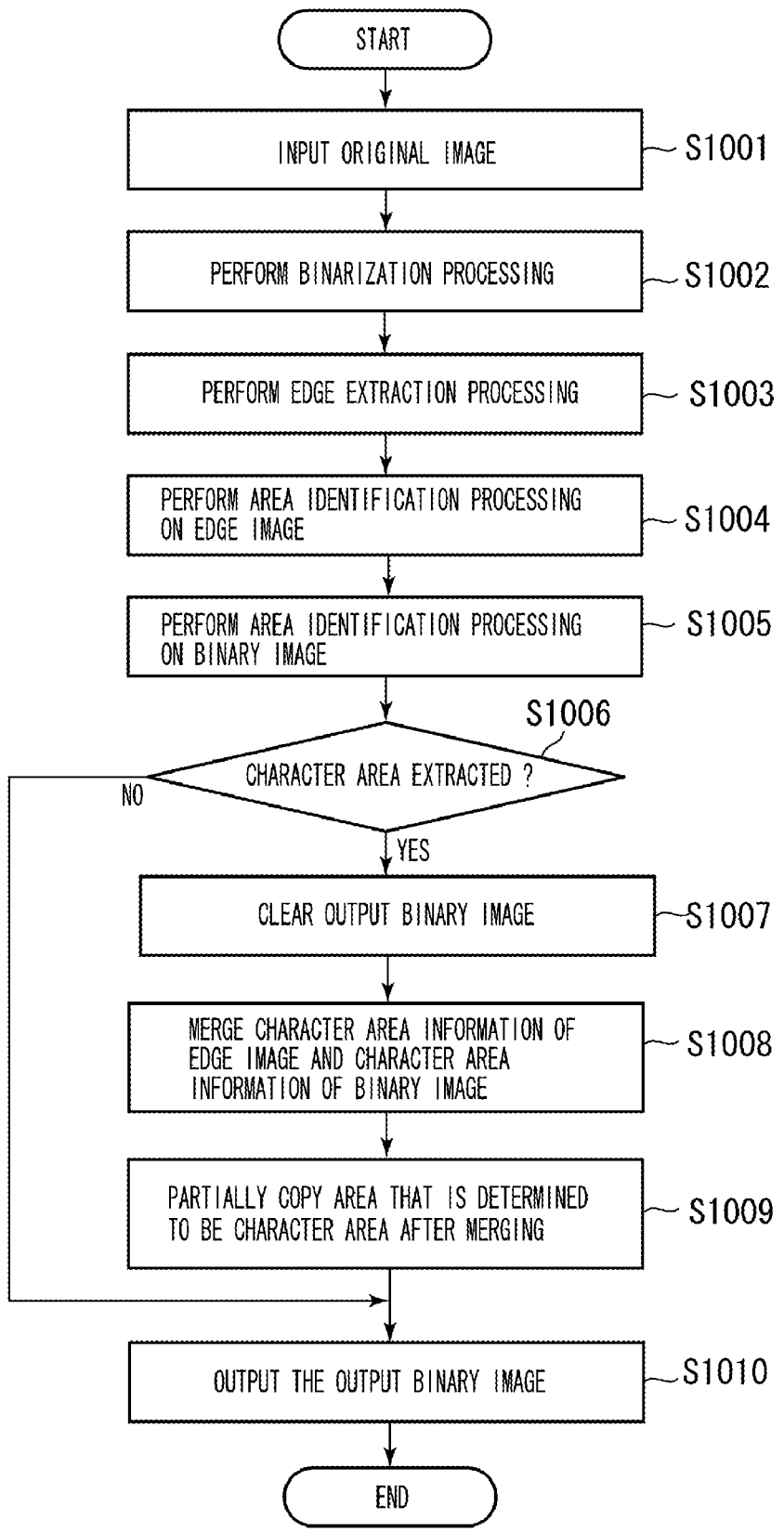
FIG. 10 is a flow chart that illustrates processing according to the second exemplary embodiment of the present invention.

FIG. 10 is a flow chart that illustrates processing according to the second exemplary embodiment. In step S1001, the CPU 1201 reads an image of a document to be processed as the original image 901. In step 1002, the binarization processing unit 903 binarizes the original image 901 to generate the binary image 905. If the read original image is a binary image, the binarization processing can be skipped.

In step S1003, the edge extraction unit 902 extracts edges from the binary image 905 generated in step S1002 to generate the edge image 904. In step S1004, the area identification processing unit 906 extracts a character area 908 from the edge image 904. In step S1005, the area identification processing unit 907 extracts a character area 909 from the binary image 905.

The same processing method can be used for the area identification processing units 906 and 907, although images to be processed by each of the area identification processing units 906 and 907 are mutually different.

In step S1006, the CPU 1201 determines whether a character area has been extracted in step S1004 and step S1005. If it is determined that no character area is extracted in both step S1004 and step S1005, the CPU 1201 outputs the binary image 905 generated in step S1002 as the output binary image 913.

On the other hand, if it is determined in step S1006 that a character area is extracted in step S1004 and step S1005, the processing advances to step S1007. In step S1007, the CPU 1201 initializes the output binary image 913.

In step S1008, the area identification result merging processing unit 910 merges two area identification results, namely, the area identification result 908 and the area identification result 909, which are extracted in step S1004 and step S1005, respectively, to generate the merged area identification result 911. The processing for merging the area identification results in step S1008 by the area identification result merging processing unit 910 is performed in a similar manner as described with reference to FIG. 3 according to the first exemplary embodiment.

In step S1009, the partial binarization processing unit 912, based on a character area portion of the merged area identification result 911 generated in step S1008, copies only a concerned character area of the binary image 905 to the output binary image 913 by overwriting onto the output binary image 913.

In step S1010, the CPU 1201 outputs the output binary image 913 and the merged area identification result 911 as a final result.

Figure 11:
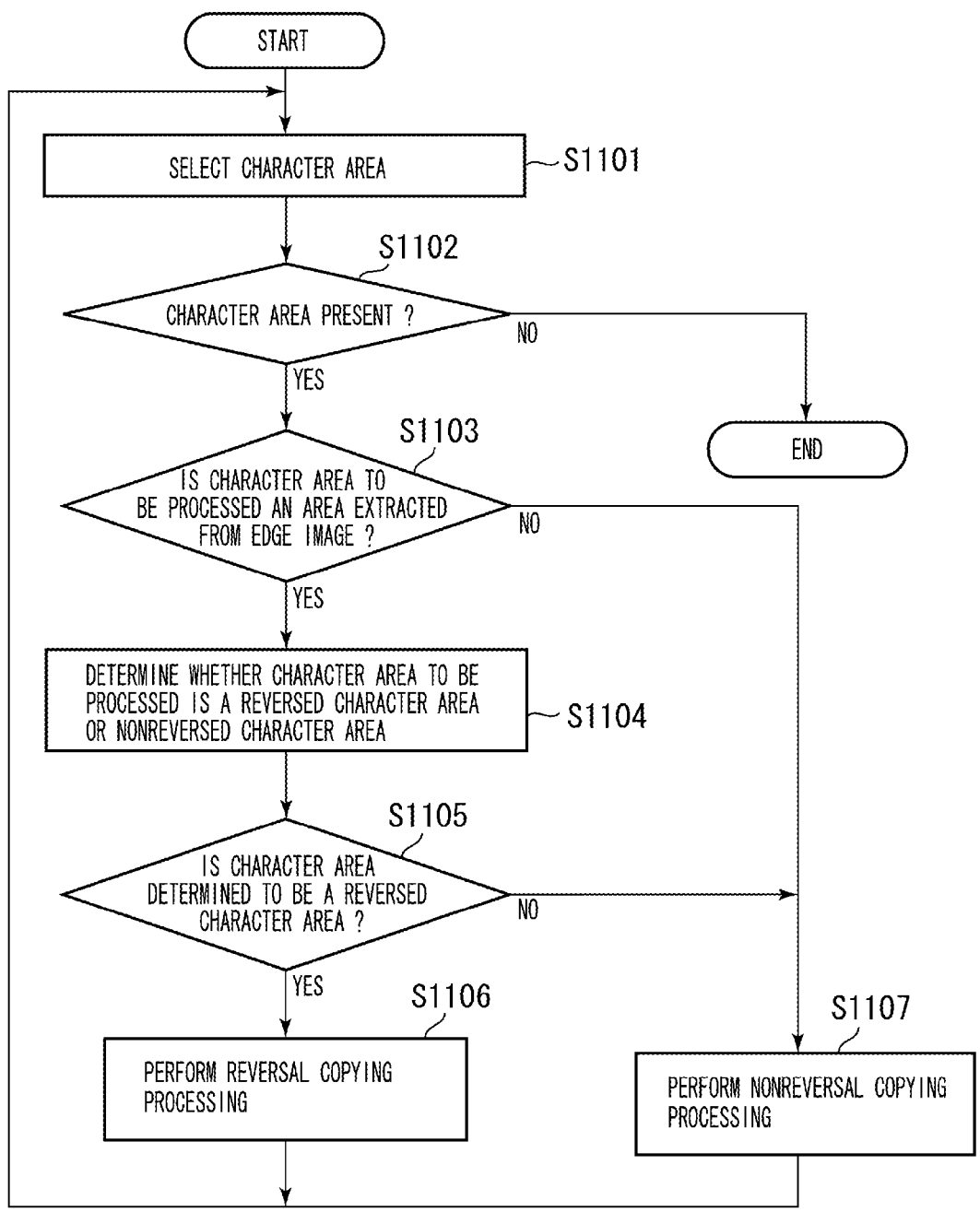
FIG. 11 is a flow chart that illustrates partial binarization processing according to the second exemplary embodiment of the present invention.

FIG. 11 is a flow chart that illustrates processing in step S1009 performed by the partial binarization processing unit 912.

In step S1101, the partial binarization processing unit 912 selects a character area from the merged area identification result 911. In step S1102, if it is determined that a character area to be selected remains, the processing advances to step S1103. On the other hand, if it is determined that no character area to be selected remains, the processing ends.

In step S1103, the partial binarization processing unit 912 determines whether the area that is currently processed is either data in the area identification result 908 or data in the area identification result 909. Here, the character area information that is added in step S305 is the data in the area identification result 909, and the character area information that is added in step S311 is the data in the area identification result 908. If it is determined in step S1103 that the area that is currently processed is the data in the area identification result 908 (namely, a character area extracted from the edge image 904), the processing advances to step S1104. On the other hand, if it is determined in step S1103 that the area that is currently processed is not the data in the area identification result 908, the processing advances to step S1107. In step S1105, the partial binarization processing unit 912 performs reversed/nonreversed character area determination processing. In the reversed/nonreversed character area determination processing, the partial binarization processing unit 912 determines whether the character area to be processed is a nonreversed character area, which includes dark characters on a bright background surface or a reversed character area, which includes bright characters on a dark background surface. The reversed/nonreversed character area determination processing includes the following methods 1 and 2.

<A reversed/nonreversed character area determination processing 1> In the reversed/nonreversed character area determination processing 1, the partial binarization processing unit 912 computes a white-to-black pixel ratio in a concerned portion of the binary image 905 and determines whether the character area is either a reversed character area or a nonreversed character area based on the white-to-black pixel ratio. If it is determined that the number of white pixels in the character area is larger than the number of black pixels, the partial binarization processing unit 912 determines that the character area is a nonreversed character area. On the other hand, if the number of white pixels in the character area is smaller than the number of black pixels, the partial binarization processing unit 912 determines that the character area is a reversed character area.

<A reversed/nonreversed character area determination processing 2> In the reversed/nonreversed character area determination processing 2, the partial binarization processing unit 912 computes a white-to-black pixel ratio with respect to pixels in a boundary portion of the rectangular character area to be processed. If it is determined that the number of white pixels in the boundary area is larger than the number of black pixels, the partial binarization processing unit 912 determines that the character area is a nonreversed character area. On the other hand, if the number of white pixels in the boundary area is smaller than the number of black pixels, the partial binarization processing unit 912 determines that the character area is a reversed character area.

If it is determined in step S1105 that the character area is a reversed character area, then in step S1106, the partial binarization processing unit 912 reverses the concerned portion of the binary image 905 and copies the reversed concerned portion onto the output binary image 913. On the other hand, if it is determined in step S1105 that the character area is a nonreversed character area, then in step S1107, the partial binarization processing unit 912 copies the concerned portion of the binary image 905 onto the output binary image 913.

After the processing in step S1106 and step S1107 is completed, the processing returns to step S1101 to advance to processing for selecting the next character area.

According to the second exemplary embodiment, an original image can be processed regardless of whether the original image is a multilevel image or a binary image. In addition, since the original image 901 is not required after the binarization processing in step S1002 is completed, a memory can be shared for storing the original image 901 and the output binary image 913. Thus, the number of required memories can be substantially reduced. Furthermore, since most of the processing is performed on a binary image, the processing time can be further shortened.

Other Exemplary Embodiments

The present invention can be applied to a system or a merging apparatus including a plurality of devices (for example, a computer, an interface device, a reader, and a printer) and to an apparatus that includes one device. In addition, the present invention can also be achieved by providing the system or the device with a storage medium which stores program code of software implementing the functions of the embodiments and by reading and executing the program code stored in the storage medium with a computer of the system or the device (a CPU or an MPU). In this case, the program code itself, which is read from the storage medium, implements the functions of the exemplary embodiments mentioned above, and accordingly, the storage medium storing the program code constitutes the present invention.

The storage medium for supplying such program code includes a hard disk, an optical disk, a magneto-optical disk, a magnetic tape, a nonvolatile memory card, a ROM, and the like.

Moreover, the functions according to the exemplary embodiments described above can be implemented by the processing in which an operating system (OS) or the like operating on a computer carries out a part of or the whole of the actual processing based on an instruction given by the program code.

Furthermore, after the program code read from the storage medium is written in a memory provided in a function expansion board inserted in the computer or in a function expansion unit connected to the computer, a CPU and the like provided in the function expansion board or the function expansion unit can carry out a part of or the whole of the processing to implement the functions of the embodiments as described above.

In addition, the present invention can be applied to a case where a program is distributed from a storage medium storing program code of software that implements the functions of the above exemplary embodiments to a person who requests a distribution of the program via a communication line such as a personal computer network.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-000670 filed Jan. 5, 2006, which is hereby incorporated by reference herein in its entirety.

What is claimed is:

1. An apparatus comprising:
   a binary image generation unit configured to generate binary image data by performing binarization processing on input image data;
   an edge image generation unit configured to generate edge image data by performing edge extraction processing on the input image data;
   a first area identification unit configured to acquire a first area identification result by performing area identification processing on the binary image data;
   a second area identification unit configured to acquire a second area identification result by performing area identification processing on the edge image data;
   a merging unit configured to generate a merged area identification result by merging the first area identification result and the second area identification result; and
   an output binary image generation unit configured to generate output binary image data by performing partial binarization processing on the input image data according to each character area included in the merged area identification result.

2. The apparatus according to claim 1, wherein, with respect to each character area included in the merged area identification result, the output binary image generation unit determines whether the character area is either a character area obtained by merging the first area identification result or a character area obtained by merging the second area identification result,
   wherein if the character area is determined to be a character area obtained by merging the first area identification result, the output binary image generation unit performs nonreversal binarization processing on the character area, and
   wherein if the character area is determined to be a character area obtained by merging the second area identification result, the output binary image generation unit further determines whether the character area is either a reversed character area or a nonreversed character area, and if it is determined that the character area is a reversed character area, the output binary image generation unit performs reversal and binarization processing on the character area, and if it is determined that the character area is a nonreversed character area, the output binary image generation unit performs nonreversal binarization processing on the character area.

3. The apparatus according to claim 1, wherein the merging unit compares a character area included in the first area identification result with a character area included in the second area identification result, and if there is an overlapping character area, the merging unit generates the merged area identification result based on the overlapping character area.

4. The apparatus according to claim 3, wherein, if a character area included in the second area identification result contains a character area included in the first area identification result and an area ratio of the character area included in the second area identification result to the character area included in the first area identification result is equal to or larger than a predetermined threshold value, the merging unit does not merge the character area included in the first area identification result into the merged area identification result.

5. The apparatus according to claim 3, wherein, if a part of the character area included in the first area identification result and a part of the character area included in the second area identification result overlap each other and, when the character area included in the second area identification result is divided by extensions of four straight lines that constitute four sides of a rectangle surrounding the character area included in the first area identification result, the merging unit substitutes information of the character area included in the second area identification result with information of a divided character area obtained in a case where an area of a divided character area that does not overlap the character area included in the first area identification result, of the divided character areas, is maximum.

6. The apparatus according to claim 3, wherein, if it is determined that that a same character area is extracted with respect to the character area included in the first area identification result and the character area included in the second area identification result, the merging unit does not merge the character area included in the second area identification result into the merged area identification result.

7. An apparatus comprising:
a binary image generation unit configured to generate binary image data by performing binarization processing on input image data;
an edge image generation unit configured to generate edge image data by performing edge extraction processing on the binary image data;
a first area identification unit configured to acquire a first area identification result by performing area identification processing on the binary image data;
a second area identification unit configured to acquire a second area identification result by performing area identification processing on the edge image data;
a merging unit configured to generate a merged area identification result by merging the first area identification result and the second area identification result; and
an output binary image generation unit configured to generate output binary image data by performing partial binarization processing on the binary image data according to each character area included in the merged area identification result.

8. A method that can be performed by an apparatus including a processor, the method comprising:
performing, by the processor, binarization processing on input image data to generate binary image data;
performing, by the processor, edge extraction processing on the input image data to generate edge image data;
performing, by the processor, area identification processing on the binary image data to generate a first area identification result;
performing, by the processor, area identification processing on the edge image data to generate a second area identification result;
merging, by the processor, the first area identification result and the second area identification result to generate a merged area identification result; and
performing, by the processor, partial binarization processing on the input image data according to each character area included in the merged area identification result to generate output binary image data.

9. A method that can be performed by an apparatus including a processor, the method comprising:
performing, by the processor, binarization processing on input image data to generate binary image data;
performing, by the processor, edge extraction processing on the binary image data to generate edge image data;
performing, by the processor, area identification processing on the binary image data to generate a first area identification result;
performing, by the processor, area identification processing on the edge image data to generate a second area identification result;
merging, by the processor, the first area identification result and the second area identification result to generate a merged area identification result; and
performing, by the processor, partial binarization processing on the binary image data according to each character area in the merged area identification result to generate output binary image data.

10. A computer-readable storage medium storing instructions which, when executed by an apparatus, causes the apparatus to perform operations comprising:
performing binarization processing on input image data to generate binary image data;
performing edge extraction processing on the input image data to generate edge image data;
performing area identification processing on the binary image data to generate a first area identification result;
performing area identification processing on the edge image data to generate a second area identification result;
merging the first area identification result and the second area identification result to generate a merged area identification result; and
performing partial binarization processing on the input image data according to each character area included in the merged area identification result to generate an output binary image data.

11. A computer-readable storage medium storing instructions which, when executed by an apparatus, causes the apparatus to perform operations comprising:
performing binarization processing on input image data to generate binary image data;
performing edge extraction processing on the binary image data to generate edge image data;
performing area identification processing on the binary image data to generate a first data identification result;

performing area identification processing on the edge image data to generate a second area identification result;

merging the first area identification result and the second area identification result to generate a merged area identification result; and performing partial binarization processing on the binary image data according to each character area in the merged area identification result to generate an output binary image data.

* * * * *